3,299,262
FLASHLIGHT
Walter L. Duncan, Central St., Rowley, Mass. 01969
Filed Mar. 1, 1965, Ser. No. 435,826
2 Claims. (Cl. 240—10.6)

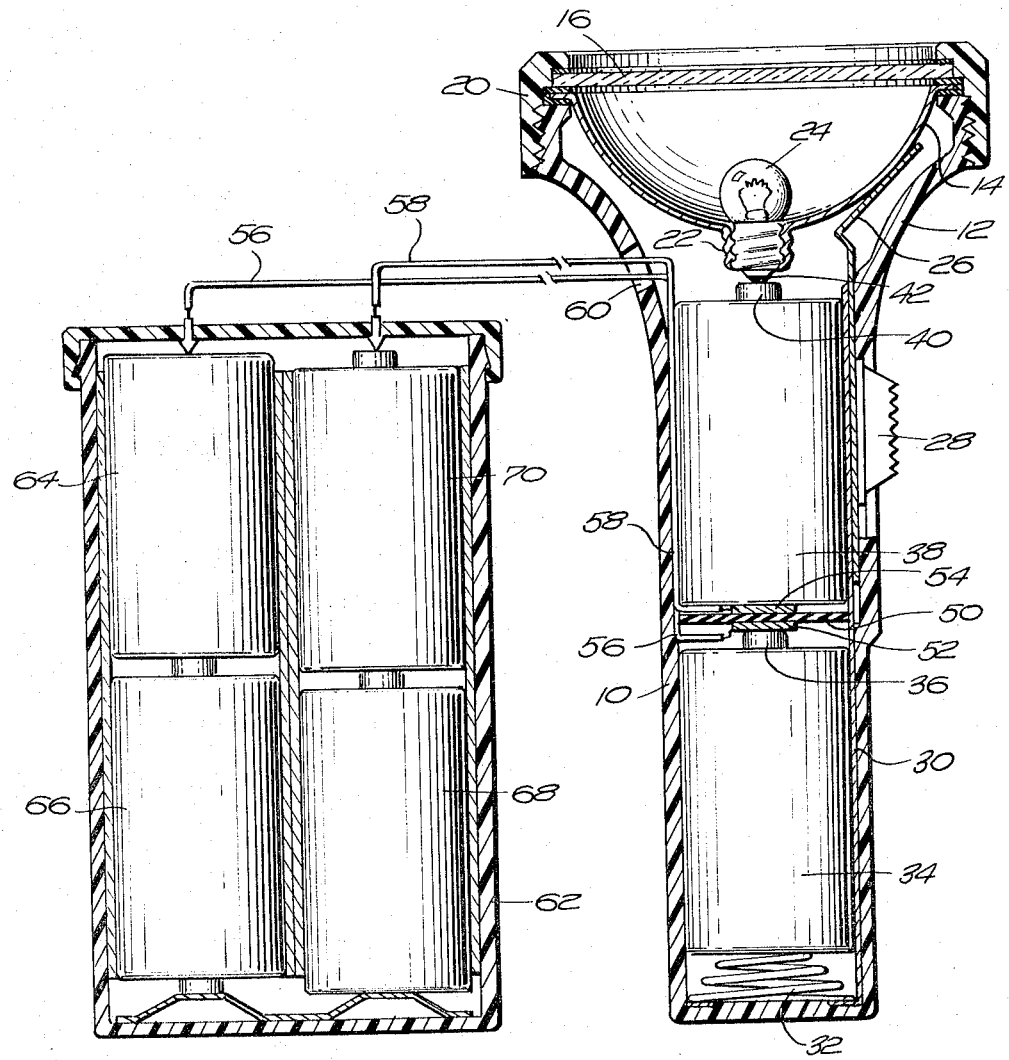

This invention relates to an ordinary flashlight, preferably of the two-cell variety, and means for connecting additional battery cells to those in the flashlight case so that a brighter light can be had without increasing the size of the flashlight.

Inspectors of meters and other objects which may be and often are in dark places which are sometimes difficult of access usually carry a conventional two-cell flashlight which can readily be gripped in a hand and which is of convenient size for carrying and for inspection in close quarters. In many cases it is desirable to have a stronger light than can be had from a bulb operating on two cells without, however, having to resort to a flashlight which is unduly heavy or clumsy, or to a flashlight having small sized cells. It is an object of the invention to provide a simple but effective means for connecting additional battery cells to those in the casing of an ordinary two-cell flashlight to change the two-cell flashlight to, e.g., a six-cell flashlight without increasing the size of the casing, the additional batteries being carried in any convenient manner apart from the flashlight.

For a more complete understanding of the invention, reference may be had to the following description thereof, and to the drawing, of which FIGURE 1 is a sectional view of a flashlight and additional batteries connected thereto; and FIGURE 2 is an enlarged perspective view of one of the parts of the connecting means.

In FIGURE 1 is illustrated an ordinary two-cell flashlight comprising a cylindrical case 10 which may be of molded plastic as shown, or of any other customary or suitable material. The lamp end of the casing may be flared or not, as at 12, to accommodate a dished reflector 14 and a protective sheet of glass or lens 16, the reflector and lens being held in place by a ring 20 which is screw-threaded on the flared end of the casing 10. As shown, the reflector 14 has a central opening with a short threaded tube 22 adapted to hold the base of a small electric light bulb 24. The metal shell of the lamp base is connected through the reflector 14 and a conductor 26 to a switch operable by a finger piece 28, the switch in turn being connected by a conductor 30 and a spring 32 to the bottom of the battery cell 34 within the casing 10. At the top of the battery cell 34 is its positive pole 36 which projects up and usually presses against the bottom of the cell 38 above it. The positive pole 40 of the upper cell presses against the end terminal 42 of the lamp 24 to complete the circuit when the switch is closed.

According to the invention, the 2-cell flashlight is changed into a 6-volt flashlight by inserting between the batteries 34 and 38 a disk 50 of insulation which is between two metal disk 52 and 54 secured to the respective faces of the disk 50. Wires 56 and 58 attached respectively to the metal disks 52 and 54 lead out through a conveniently located hole 60 in the case 10 to a container 62 in which are supplementary battery cells 64, 66, 68 and 70. These supplementary cells are connected in series with one another and with the wires 56 and 58, the latter being arranged so that the cells are also in series with the battery cells 34 and 38. While four supplementary cells are shown on the drawing, a greater or lesser number may be employed as desired. The lamp 24 is replaced by a lamp having a rated voltage corresponding to that of all the connected cells.

The wires 56 and 58 are preferably long enough to permit the case 62 to be carried in any convenient position, the size and weight of the original 2-cell flashlight being virtually unaltered.

I claim:
1. A flashlight comprising a casing with an aperture in the side thereof, a plurality of battery cells arranged end to end in said casing, a light bulb mounted in said casing with an end bearing against an end of one of said cells, and a switch connected in series with said cells and light bulb, in combination with a separate container, battery cells carried in said container, an insulating disk having a conductor mounted on each face thereof between the ends of two of the cells in said casing, said conductors being in contact respectively with said two cells, and wires connecting said conductors in series with the cells in said container, whereby the cells in the container, the cells in the casing, the light bulb and the switch are all in a single circuit.

2. A combination as described in claim 1, in which said conductors are metal disks secured to opposite faces of said insulating disk.

References Cited by the Examiner
UNITED STATES PATENTS

| | | | |
|---|---|---|---|
| 1,875,956 | 9/1932 | Thiel | 240—10.6 |
| 1,900,906 | 3/1933 | Brown | 240—10.6 |
| 2,597,073 | 5/1952 | Cunningham | 240—10.6 |

NORTON ANSHER, *Primary Examiner.*